United States Patent Office 3,116,284
Patented Dec. 31, 1963

3,116,284
α-(3,3-DIMETHYL-1-AZETIDINYL)-2,6-DIMETHYL-ACETANILIDE AND SALTS THEREOF
Emilio Testa, San Simone, Vacallo, Ticino, Switzerland, assignor to Lepetit S.p.A., Milan, Italy
No Drawing. Filed Oct. 7, 1960, Ser. No. 61,088
Claims priority, application Italy Oct. 14, 1959
3 Claims. (Cl. 260—239)

The present invention is concerned with a new therapeutic agent. More particularly the compound of the invention is α-(3,3-dimethyl-1-azetidinyl)-2,6-dimethylacetanilide of the formula

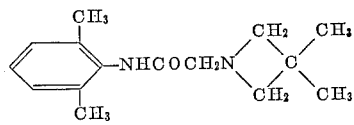

The new compound has been found highly effective as local anesthetic. Its activity has proven higher than that of cocaine and lidocaine and its toxicity is sufficiently low to allow its safe administration in man.

The following table gives the results of a comparison between isodynamic doses of α-(3,3-dimethyl-1-azetidinyl)-2,6-dimethylacetanilide (DAD) and of lidocaine in experiments carried out on animals.

TABLE

| | Doses and isodynamic concentrations | | Ratio, Lidocaine/DAD |
|---|---|---|---|
| | Lidocaine | DAD | |
| Surface anesthesia (rabbit) | 1% | 0.25% | 4 |
| Infiltration anesthesia (guinea pig) | 1% | ≥0.25% | ≤4 |
| Block anesthesia (guinea pig) | 6.15‰ | 2.63‰ | 2.11 |
| Extradural lombo-sacral anesthesia (frog) | 2% | 0.5% | ~4 |
| Neural transmission anesthesia (sciatic-gastrocnemius, frog) | 0.5‰ | 0.2‰ | 2.5 |

The product is preferably used in the form of addition salts with non-toxic mineral acids.

Doses are varied according to the desired effect. In any case these doses are far lower than the corresponding doses of lidocaine.

The process for preparing the new compound comprises gradually adding to the hydrochloride of a 3,3-dimethyl-azetidine an equimolecular amount of α-chloroaceto-2,6-xylidide in the presence of an excess over two equivalents, and preferably 3–5 equivalents, of a tertiary aliphatic amine, such as triethylamine, in an inert organic solvent. The solution is then heated at 50–80° C., filtered, the solvent removed and the residue distilled in vacuo.

The following example is illustrative of the invention.

*Example*

To a solution of 41 g. of 3,3-dimethylazetidine hydrochloride and 93 g. of triethylamine in 400 ml. of anhydrous benzene 60 g. of α-chloroaceto-2,6-xylidide are gradually added with stirring at room temperature. The solution is then heated at about 70° C. for 5 hours, filtered and evaporated to dryness. The residue is distilled and collected at 175–185° C./0.5 mm. M.P. 93–95°. Yield 55 g. Hydrochloride: M.P. 195°–197°.

I claim:
1. A compound selected from the class consisting of α-(3,3-dimethyl-1-azetidinyl)-2,6-dimethylacetanilide and its non-toxic mineral acid addition salts.
2. α-(3,3 - dimethyl - 1 - azetidinyl)-2,6-dimethylacetanilide.
3. α-(3,3-dimethyl - 1 - azetidinyl)-2,6-dimethylacetanilide hydrochloride.

References Cited in the file of this patent
UNITED STATES PATENTS
2,813,861    Schlesinger et al. _____ Nov. 19, 1961

OTHER REFERENCES

Chemical Abstracts, vol. 33, p. 4197 (1939), abstracting Yanbikov, J. Gen. Chem. (U.S.S.R.), vol. 8, pp. 1470-5 (1938).
Richter: The Chemistry of Carbon Compounds, vol. IV (1947), page 5.
Noller: Textbook of Organic Chemistry, second edition (1958), page 21.
Tisler: Tetrahedron Letters, 1959, No. 12, pages 12–15.
Tisler: Arch. Pharm., vol. 293, 621–6.